(12) United States Patent
Lee et al.

(10) Patent No.: US 8,946,337 B2
(45) Date of Patent: Feb. 3, 2015

(54) THERMOPLASTIC RESIN COMPOSITION AND MOLDED PRODUCT USING THE SAME

(75) Inventors: Hyung-Tak Lee, Uiwang-si (KR); Doo-Han Ha, Uiwang-si (KR); Jin-Kyung Cho, Uiwang-si (KR); Young-Chul Kwon, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/535,872

(22) Filed: Jun. 28, 2012

(65) Prior Publication Data

US 2012/0270988 A1    Oct. 25, 2012

Related U.S. Application Data

(63) Continuation-in-part of application No. PCT/KR2010/008599, filed on Dec. 2, 2010.

(30) Foreign Application Priority Data

Dec. 31, 2009 (KR) .................. 10-2009-0135999
Jun. 10, 2010 (KR) .................. 10-2010-0054948

(51) Int. Cl.

| | | |
|---|---|---|
| C08L 55/02 | (2006.01) | |
| C08K 3/40 | (2006.01) | |
| C08K 3/08 | (2006.01) | |
| C08J 5/00 | (2006.01) | |
| C08L 69/00 | (2006.01) | |
| C08L 101/00 | (2006.01) | |
| C08K 7/02 | (2006.01) | |

(52) U.S. Cl.
CPC ... *C08J 5/00* (2013.01); *C08K 3/08* (2013.01); *C08L 69/00* (2013.01); *C08L 101/00* (2013.01); *C08L 55/02* (2013.01); *C08K 3/40* (2013.01); *C08K 7/02* (2013.01)
USPC .................... 524/441; 524/439; 524/440

(58) Field of Classification Search
USPC ................................. 524/439–441
See application file for complete search history.

(56) References Cited

U.S. PATENT DOCUMENTS

| | | | |
|---|---|---|---|
| 4,430,173 A | | 2/1984 | Boudot et al. |
| 4,891,068 A | * | 1/1990 | Masumoto et al. ........... 428/402 |
| 5,087,657 A | * | 2/1992 | Qureshi et al. ................ 524/508 |
| 5,198,042 A | * | 3/1993 | Masumoto et al. ........... 148/403 |
| 5,530,051 A | | 6/1996 | Hirata et al. |
| 6,270,895 B1 | | 8/2001 | Needham et al. |
| 7,312,257 B2 | | 12/2007 | Hobbs et al. |

(Continued)

FOREIGN PATENT DOCUMENTS

| | | |
|---|---|---|
| CN | 1764691 A | 4/2006 |
| JP | 57-126848 A | 8/1982 |

(Continued)

OTHER PUBLICATIONS

Machine translated English equivalent of JP 2617377 (Jun. 1997, 7 pages).*

(Continued)

*Primary Examiner* — Brieann R Fink
(74) *Attorney, Agent, or Firm* — Additon, Higgins & Pendleton, P.A.

(57) ABSTRACT

Provided are a thermoplastic resin composition including a thermoplastic resin and an amorphous sheet-shaped metal particle having a ratio of thickness relative to long diameter of about 1:20 to about 1:1, and a molded product using the same.

11 Claims, 2 Drawing Sheets

(56) References Cited

U.S. PATENT DOCUMENTS

| | | | |
|---|---|---|---|
| 2007/0026143 A1* | 2/2007 | Campbell | 427/180 |
| 2007/0276083 A1 | 11/2007 | Higashi et al. | |
| 2012/0264869 A1 | 10/2012 | Lee et al. | |
| 2013/0035416 A1* | 2/2013 | Horio et al. | 523/351 |

FOREIGN PATENT DOCUMENTS

| | | | |
|---|---|---|---|
| JP | 58-069231 A | | 4/1983 |
| JP | 60069160 A | * | 4/1985 |
| JP | 61-159453 | | 7/1986 |
| JP | 07-156299 A | | 6/1995 |
| JP | 07-156299 A1 | | 6/1995 |
| JP | 07-196901 A | | 8/1995 |
| JP | 08-066927 A | | 3/1996 |
| JP | 08-109340 A | | 4/1996 |
| JP | 2617377 B2 | * | 6/1997 |
| JP | 10-182873 A | | 7/1998 |
| JP | 11-279434 A | | 10/1999 |
| JP | 2000-313747 A | | 11/2000 |
| JP | 2001-226601 A | | 8/2001 |
| JP | 2001-262003 A | | 9/2001 |
| JP | 2003-049082 A | | 2/2003 |
| JP | 2003-200477 A | | 7/2003 |
| JP | 3745476 | | 12/2005 |
| JP | 2006-137888 A | | 6/2006 |
| JP | 2007-137963 A | | 6/2007 |
| JP | 4048782 A | | 12/2007 |
| JP | 2009-040928 A | | 2/2009 |
| KR | 10-0550808 A | | 12/2003 |
| KR | 10-0789244 A | | 11/2006 |
| KR | 10-0739192 A | | 7/2007 |
| WO | 2011/081305 A2 | | 7/2011 |
| WO | 2011081304 A2 | | 7/2011 |

OTHER PUBLICATIONS

Japanese abstract of JP 60069160 (Apr. 1985).*
International Search Report in counterpart International Application No. PCT/KR2010/008599 dated Aug. 22, 2011, pp. 1-9.
Jeong et al., "A study on the optimization to improve the surface appearance of PP/Metal composites", Applied Chemistry, vol. 13, No. 2, Oct. 2009, pp. 173-176.
Chinese Search Report in counterpart Chinese Application No. 2010800599427 dated May 16, 2013, pp. 1-2.
International Search Report in commonly owned International Application No. PCT/KR2010/008596 dated Aug. 22, 2011, pp. 1-9.
Starr, "Glass-Fibre Directory and Databook" Edition 2, 8.1 Flake Glass: 1.11 Nippon Sheet Glass Co., Ltd. (1997) p. 323.
CAPlus Abstract of JP 61-159453 (AN 1986:573852, Jul. 1986).
Machine translated English equivalent of JP 07-156299 (Jun. 1995, 10 pages).
Machine translated English equivalent of JP 2003-049082 (Feb. 2003, 4 pages).
Office Action in commonly owned U.S. Appl. No. 13/535,939 mailed Mar. 25, 2013, pp. 1-16.

* cited by examiner

THERMOPLASTIC RESIN COMPOSITION AND MOLDED PRODUCT USING THE SAME

CROSS-REFERENCE TO RELATED APPLICATIONS

This application is a continuation-in-part of International Application No. PCT/KR2010/008599, filed Dec. 2, 2010, pending, which designates the U.S., published as WO 2011/081305, and is incorporated herein by reference in its entirety, and claims priority therefrom under 35 USC Section 120. This application also claims priority under 35 USC Section 119 from Korean Patent Application No. 10-2009-0135999, filed Dec. 31, 2009, and Korean Patent Application No. 10-2010-0054948, filed Jun. 10, 2010, in the Korean Intellectual Property Office, the entire disclosure of each of which is also incorporated herein by reference.

FIELD

This disclosure relates to a thermoplastic resin composition that can have an excellent appearance and a molded product using the same.

BACKGROUND

Recently, plastic exterior products with diverse colors are becoming increasingly popular for electronic parts, automobile parts and the like, and plastic exterior products with a high quality sense of touch.

Plastic exterior products usually include a plastic resin and a metal to give the appearance of a metal-like texture to the resin, such as discussed in Japanese Patent Laid-Open Publication Nos. 2001-262003 and 2007-137963. The metal-like texture, however, did not appear in an actual experiment, and there is a problem in that a flow mark or a weld line is formed during an injection process.

Japanese Patent Laid-Open Publication No. 1995-196901 gives a metal-like texture by adding a metal microplate to a plastic resin. The metal microplate is obtained by a punching process and has the luster of an average shape ratio (thickness/average particle diameter) of 1/100 to 1/8. This technology, however, also has limitations such as formation of weld line.

SUMMARY

One embodiment provides a thermoplastic resin composition that can have excellent impact resistance, may not form a flow mark and/or a weld line, and can have the appearance of a metal-like texture.

Another embodiment provides a molded product using the thermoplastic resin composition.

The thermoplastic resin composition can include a thermoplastic resin; and an amorphous sheet-shaped metal particle having a ratio of thickness relative to long diameter of about 1:20 to about 1:1.

The thermoplastic resin composition may further include a sparkling particle having a flat surface reflecting light.

Examples of the thermoplastic resin may include without limitation polycarbonate resins, rubber modified vinyl-based copolymer resins, polyester resins, polyalkyl(meth)acrylate resins, and the like, and combinations thereof.

The amorphous sheet-shaped metal particle may be made of a material including aluminum, copper, gold, or a combination thereof.

The amorphous sheet-shaped metal particle may have a ratio of thickness relative to long diameter of about 1:15 to about 1:2.

The thermoplastic resin composition may include the amorphous sheet-shaped metal particle in an amount of about 0.05 to about 10 parts by weight based on about 100 parts by weight of the thermoplastic resin.

The sparkling particle may have a ratio of a thickness relative to long diameter of about 1:10 to about 1:1 and may include a metal particle obtained by punching, an inorganic particle, or a combination thereof.

The metal particle obtained by punching may be made of a material including aluminum, copper, gold, or a combination thereof.

The inorganic particle may include a glass particle, mica, graphite, a pearl particle, or a combination thereof.

The inorganic particle may have a long diameter of about 10 to about 200 μm and a thickness of about 0.5 to about 10 μm.

The sparkling particle may include the metal particle obtained by punching and the inorganic particle mixed in a weight ratio of about 1:10 to about 10:1, for example about 1:6 to about 3:1.

The thermoplastic resin composition may include the sparkling particle in an amount of about 0.01 to about 10 parts by weight based on about 100 parts by weight of the thermoplastic resin.

According to another embodiment, a molded product fabricated using the thermoplastic resin composition is provided.

The thermoplastic resin composition can have excellent impact resistance, may form minimal or no flow marks and/or weld lines, and can have an excellent appearance with a metal-like texture. Accordingly, the thermoplastic resin composition may be used in molded products that can have an excellent appearance, such as plastic exterior products, including electronic parts, automobile parts, and the like, even without a painting process.

DETAILED DESCRIPTION

Figure 1:
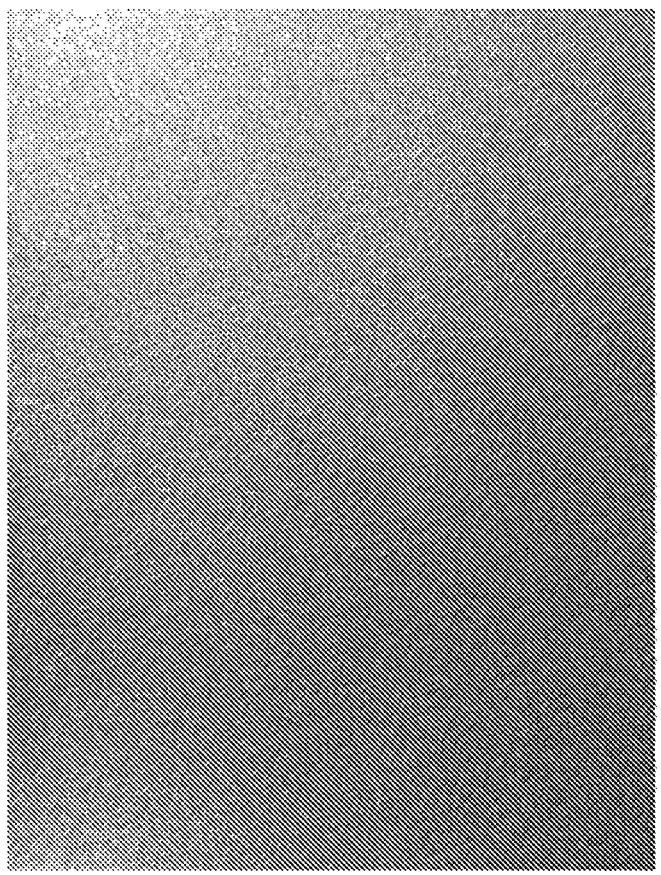
FIG. 1 is a photograph illustrating the metal-like texture and flow marks of an injection molded product formed of a thermoplastic resin composition according to Example 4.

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

When a specific definition is not otherwise provided, the term "(meth)acrylate" refers to "acrylate" and "methacrylate". "(Meth)acrylic acid alkyl ester" refers to both "acrylic acid alkyl ester" and "methacrylic acid alkyl ester", and "(meth)acrylic acid ester" refers to both "acrylic acid ester" and "methacrylic acid ester".

Unless otherwise mentioned in the present specification, a "long diameter" denotes the length of a line connecting two points in a closed curved, and the "closed curve" is a curved line where a point moves in one direction and returns to the departure point.

A thermoplastic resin composition according to one embodiment includes a thermoplastic resin and an amorphous sheet-shaped metal particle having a ratio of thickness relative to long diameter of about 1:20 to about 1:1, and may further include sparkling particle having a flat surface reflecting light.

Each component included in the thermoplastic resin composition according to embodiments will hereinafter be described in detail.

(A) Thermoplastic Resin

Examples of the thermoplastic resin may include without limitation polycarbonate resins, rubber modified vinyl-based copolymer resins, polyester resins, polyalkyl(meth)acrylate resins, and the like, and combinations thereof. The thermoplastic resin may provide basic properties such as impact resistance, heat resistance, flexural characteristics, tensile characteristics, and the like.

The polycarbonate resin may be prepared by reacting one or more diphenols with a compound such as a phosgene, halogen formate, carbonate ester, or a combination thereof. Examples of the diphenols include without limitation hydroquinone, resorcinol, 4,4'-dihydroxydiphenyl, 2,2-bis(4-hydroxyphenyl)propane (referred to as "bisphenol-A"), 2,4-bis (4-hydroxyphenyl)-2-methylbutane, bis(4-hydroxyphenyl) methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis (4-hydroxyphenyl)ketone, bis(4-hydroxyphenyl)ether, and the like, and combinations thereof. In exemplary embodiments, 2,2-bis(4-hydroxyphenyl)propane, 2,2-bis(3,5-dichloro-4-hydroxyphenyl)propane, or 1,1-bis(4-hydroxyphenyl)cyclohexane, for example 2,2-bis(4-hydroxyphenyl)propane, may be used.

The polycarbonate resin may have a weight average molecular weight of about 10,000 to about 200,000 g/mol, for example about 15,000 to about 80,000 g/mol, but is not limited thereto.

The polycarbonate resin may be a mixture of copolymers obtained using two or more dipenols that differ from each other. The polycarbonate resin may include a linear polycarbonate resin, a branched polycarbonate resin, a polyestercarbonate copolymer resin, and the like, as well as combinations thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with one or more diphenols and a carbonate. The multi-functional aromatic compound may be included in an amount of about 0.05 to about 2 mol % based on the total weight of the branched polycarbonate resin. The polyester carbonate copolymer resin may be produced by reacting difunctional carboxylic acid with one or more diphenols and a carbonate. The carbonate may include a diaryl carbonate such as diphenyl carbonate, ethylene carbonate, and the like.

The rubber modified vinyl-based copolymer resin is a copolymer wherein about 5 to about 95 wt % of a vinyl-based polymer is grafted on about 5 to about 95 wt % of a rubbery polymer.

In some embodiments, the rubber modified vinyl-based copolymer resin may include a rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the rubbery polymer can be in a range from about any of the foregoing amounts to about any other of the foregoing amounts.

In some embodiments, the rubber modified vinyl-based copolymer resin may include a vinyl-based polymer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the vinyl-based polymer can be in a range from about any of the foregoing amounts to about any other of the foregoing amounts.

The vinyl-based polymer may be a polymer of about 50 to about 95 wt % of a first vinyl-based monomer including an aromatic vinyl monomer, an acrylic-based monomer, a heterocyclic monomer, or a combination thereof; and about 5 to about 50 wt % of a second vinyl-based monomer including an unsaturated nitrile monomer, an acrylic-based monomer, a heterocyclic monomer, or a combination thereof.

In some embodiments, the vinyl-based polymer may include a first vinyl-based monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the first vinyl-based monomer can be in a range from about any of the foregoing amounts to about any other of the foregoing amounts.

In some embodiments, the vinyl-based polymer may include a second vinyl-based monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the second vinyl-based monomer can be in a range from about any of the foregoing amounts to about any other of the foregoing amounts.

Examples of the aromatic vinyl monomer may include without limitation styrene, C1 to C10 alkyl-substituted styrene, halogen-substituted styrene, and the like, and combinations thereof. Examples of the alkyl-substituted styrene may include without limitation o-ethyl styrene, m-ethyl styrene, p-ethyl styrene, α-methyl styrene, and the like, and combinations thereof.

Examples of the acrylic-based monomer may include without limitation (meth)acrylic acid alkyl esters, (meth)acrylic acid esters, and the like, and combinations thereof. As used herein, the alkyl may be a C1 to C10 alkyl. Examples of the (meth)acrylic acid alkyl ester may include without limitation methyl(meth)acrylate, ethyl(meth)acrylate, propyl(meth) acrylate, butyl(meth)acrylate, and the like, and combinations thereof. In exemplary embodiments, methyl(meth)acrylate may be used. Examples of the (meth)acrylic acid ester may include without limitation (meth)acrylate, and the like.

Examples of the heterocyclic monomer may include without limitation maleic anhydride, C1-C10 alkyl- or phenyl N-substituted maleimide, and the like, and combinations thereof.

Examples of the unsaturated nitrile monomer may include without limitation acrylonitrile, methacrylonitrile, ethacrylonitrile, and the like, and combinations thereof.

Examples of the rubbery polymer may include without limitation butadiene rubbers, acrylic rubbers, ethylene/propylene rubbers, styrene/butadiene rubbers, acrylonitrile/butadiene rubbers, isoprene rubbers, ethylene-propylene-diene terpolymer (EPDM) rubbers, polyorganosiloxane/polyalkyl (meth)acrylates, rubber composites, and the like, and combinations thereof.

When the rubber modified vinyl-based copolymer is prepared, a rubber particle may have a particle diameter of about 0.05 to about 4 μm to improve the impact resistance and surface characteristics of a molded product, and when the particle diameter of the rubber particle ranges from about 0.05 to about 4 μm, excellent impact strength may be secured.

The rubber modified vinyl-based copolymer may be used singularly or as a mixture of two or more.

The rubber modified vinyl-based copolymer may include styrene, acrylonitrile, and optionally methyl(meth)acrylate graft-copolymerized on a butadiene rubber, an acrylic rubber, or a styrene/butadiene rubber as a mixture.

The rubber modified vinyl-based copolymer may include methyl(meth)acrylate graft-copolymerized on a butadiene rubber, an acrylic rubber, or a styrene/butadiene rubber.

The rubber modified vinyl-based copolymer may include an acrylonitrile-butadiene-styrene graft copolymer.

The method of preparing the rubber modified vinyl-based copolymer is widely known to those skilled in the art, and any method among emulsion polymerization, suspension polymerization, solution polymerization and mass (bulk) polymerization may be used. Emulsion polymerization or mass polymerization can be conducted by adding the aforementioned aromatic vinyl monomer to a rubbery polymer and using a polymerization initiator.

The polyester resin can be an aromatic polyester resin, and it may be a condensation-polymerized resin obtained from melt polymerization of terephthalic acid or alkyl ester terephthalate, and a C2 to C10 glycol component. As used herein with reference to the alkyl ester terephthalate, the alkyl may be a C1 to C10 alkyl.

Examples of the aromatic polyester resin may include without limitation polyethylene terephthalate resins, polytrimethylene terephthalate resins, polybutylene terephthalate resins, polyhexamethylene terephthalate resins, polycyclohexane dimethylene terephthalate resins, one of the foregoing polyester resins modified into a non-crystalline resin by mixing the resin with another monomer, and the like, and combinations thereof. In exemplary embodiments, the aromatic polyester resin can be a polyethylene terephthalate resin, a polytrimethylene terephthalate resin, a polybutylene terephthalate resin, and/or a non-crystalline polyethylene terephthalate resin, for example a polybutylene terephthalate resin and/or a polyethylene terephthalate resin.

The polybutylene terephthalate resin is a condensation-polymerized polymer obtained through a direct ester reaction or an ester exchange reaction of 1,4-butanediol and terephthalic acid or dimethyl terephthalate monomer.

To increase the impact strength of the polybutylene terephthalate resin, the polybutylene terephthalate resin may be copolymerized with polytetramethylene glycol (PTMG), polyethylene glycol (PEG), polypropylene glycol (PPG), a low molecular-weight aliphatic polyester, or aliphatic polyamide. Also the polybutylene terephthalate resin may be used in the form of a modified polybutylene terephthalate resin obtained by blending with a component improving impact strength.

The polybutylene terephthalate resin may have an intrinsic viscosity [η] of about 0.35 to about 1.5 dl/g, for example about 0.5 to about 1.3 dl/g in o-chloro phenol at 25° C. Within the polybutylene terephthalate resin has an intrinsic viscosity [η] within the above range, the polybutylene terephthalate resin may have excellent mechanical strength and formability.

The polyalkyl(meth)acrylate resin may be obtained by polymerizing a monomer material including an alkyl(meth)acrylate using a known polymerization method, such as a suspension polymerization method, a mass polymerization method, an emulsion method and the like.

The alkyl(meth)acrylate may have a C1 to C10 alkyl group. Examples of the alkyl(meth)acrylate may include without limitation methyl(meth)acrylate, ethyl(meth)acrylate, butyl(meth)acrylate, glycidyl(meth)acrylate, hydroxyethyl(meth)acrylate, and the like, and combinations thereof.

The alkyl(meth)acrylate may be included in an amount of greater than or equal to about 50 wt % based on the total amount (weight) of the polyalkyl(meth)acrylate. In some embodiments, the polyalkyl(meth)acrylate resin may include an alkyl(meth)acrylate in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt %. Further, according to some embodiments of the present invention, the amount of the alkyl(meth)acrylate can be in a range from about any of the foregoing amounts to about any other of the foregoing amounts.

The polyalkyl(meth)acrylate may have a weight average molecular weight of about 10,000 to about 200,000 g/mol, for example about 15,000 to about 150,000 g/mol. When the polyalkyl(meth)acrylate has a weight average molecular weight within the above range, hydrolysis resistance, scratch resistance, workability, and the like may be improved.

(B) Amorphous Sheet-Shaped Metal Particle

The amorphous sheet-shaped metal particle may provide the thermoplastic resin with a metal-like texture.

As used herein with reference to the sheet-shaped metal particle, the term amorphous refers to a non-crystalline sheet-shaped metal particle. The amorphous sheet-shaped metal particle may be commercially available.

The amorphous sheet-shaped metal particle may be made of a material including aluminum, copper, gold, or a combination thereof. In exemplary embodiments, the amorphous sheet-shaped metal particle is made of aluminum.

The amorphous sheet-shaped metal particle may have a ratio of a thickness relative to a long diameter of about 1:20 to about 1:1, for example about 1:15 to about 1:2.

As used herein, the term "sheet-shaped" can include generally rectangular shaped metal particles. Also as used herein, the term "thickness" refers to the height dimension of the sheet-shaped metal particle, and the term "long diameter" refers to the length dimension (the longest dimension) of the sheet-shaped metal particle. The skilled artisan will appreciate that the sheet-shaped metal particles are not necessarily precisely or exactly sheet-shaped but that the sheet-shaped metal particles can have variations or deviations in the shape thereof.

When the amorphous sheet-shaped metal particle has the ratio of the thickness relative to the long diameter in an amount within this range, the thermoplastic resin composition can have good flowability and can be readily processed, and a molded product formed of the same may have minimal or no flow marks and/or weld lines. Further, a molded product formed of the same may have an excellent metal-like texture.

The amorphous sheet-shaped metal particle may have a long diameter of about 10 to about 150 μm, and a cross-sectional area of about 80 to about 18,000 μm². When the amorphous sheet-shaped metal particle has a long diameter and a cross-sectional area within the above range, a molded product having minimal or no flow marks and/or weld lines and excellent metal-like texture may be provided.

The thermoplastic resin composition may include the amorphous sheet-shaped metal particle in an amount of about 0.05 to about 10 parts by weight, for example about 0.1 to about 5 parts by weight, based on about 100 parts by weight of the thermoplastic resin. In some embodiments, the thermoplastic resin composition may include the amorphous sheet-shaped metal particle in an amount of about 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the amorphous sheet-shaped metal particle can be in a range from about any of the foregoing amounts to about any other of the foregoing amounts.

When the amorphous sheet-shaped metal particle is used in an amount within the above range, a molded product having excellent impact strength, having minimal or no flow marks and/or weld lines, and having excellent metal-like texture may be obtained.

(C) Sparkling Particle

The thermoplastic resin composition may further include the sparkling particle.

The sparkling particle has a flat surface reflecting light. As used herein, the flat surface is a flat surface in which the glittering of particles may be seen with the naked eye, for example, the flat surface refers to the surface of sheet glass or a polished metal surface.

The sparkling particle may include a metal particle obtained by punching, an inorganic particle, or a combination thereof.

The metal particle obtained by punching refers to a metal particle cut in a uniform or regular shape, and it is distinguished from an inorganic particle which can have a relatively irregular shape.

The metal particle obtained by punching may be made of a material including aluminum, copper, gold, or a combination thereof. In exemplary embodiments, the metal particle may include aluminum.

The metal particle obtained by punching may have a ratio of a thickness relative to a long diameter of about 1:10 to about 1:1, for example about 1:7 to about 1:1, and as another example about 1:7 to about 1:2.

As used herein, the term "thickness" refers to the height dimension of the metal particle obtained by punching, and the term "long diameter" refers to the length dimension (the longest dimension) of the metal particle obtained by punching. The skilled artisan will appreciate that the metal particle obtained by punching does not necessarily have precise or exact dimensions but that the metal particle obtained by punching can have variations or deviations in the shape thereof.

When the metal particle obtained by punching has a ratio of thickness relative to long diameter range within the above range, a molded product having minimal or no flow marks and/or weld lines and excellent metal-like texture may be provided.

The metal particle obtained by punching may have a long diameter of about 10 to about 150 μm, and may have a cross-sectional area of about 100 to about 22,500 μm². When the metal particle obtained by punching has a long diameter and a cross-sectional area within the above range, a molded product having minimal or no flow marks and/or weld lines and excellent metal-like texture may be provided.

Examples of the inorganic particle may include without limitation glass particles, sparkling flake particles such as mica and graphite, pearl particles, and the like, and combinations thereof. In exemplary embodiments, the inorganic particle may include a glass particle.

The glass particle can have a sheet structure, and accordingly, the glass particle is different from a glass fiber which usually has a cylindrical shape. The glass fiber having a cylindrical shape does not reflect light and thus it does not significantly impart a metal-like texture. The glass particle may have circular, oval, and amorphous cross-sectional surfaces.

The inorganic particle may have a long diameter of about 10 to about 200 μm, and a thickness of about 0.5 to about 10 μm, and a cross-sectional area of about 80 to about 32,000 μm². When the inorganic particle has a long diameter, thickness, and cross-sectional area within the above ranges, a molded product having minimal or no flow marks and/or weld lines and having excellent metal-like texture may be provided.

As used herein, the term "thickness" refers to the height dimension of the inorganic particle, and the term "long diameter" refers to the length dimension (the longest dimension) of the inorganic particle.

The sparkling particle may include a mixture of the metal particle obtained by punching and the inorganic particle. The metal particle obtained by punching and the inorganic particle may be mixed in a weight ratio of about 1:10 to about 10:1, for example about 1:6 to about 3:1. When the metal particle and the inorganic particle are mixed in a weight ratio within the above range, impact strength can be improved, and a molded product having minimal or no flow marks and/or weld lines and an excellent metal-like texture may be obtained.

The thermoplastic resin composition may include the sparkling particle in an amount of about 0.01 to about 10 parts by weight, for example about 0.05 to about 1 parts by weight, based on about 100 parts by weight of the thermoplastic resin. In some embodiments, the thermoplastic resin composition may include the sparkling particle in an amount of about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight. Further, according to some embodiments of the present invention, the amount of the sparkling particle can be in a range from about any of the foregoing amounts to about any other of the foregoing amounts.

When the sparkling particle is included in an amount within the above range, a molded product having excellent impact strength, having minimal or no flow marks and/or weld lines, and an excellent metal-like texture may be obtained.

(D) Other Additive(s)

The thermoplastic resin composition according to one embodiment can includes one or more additives. Examples of the additives include without limitation antibacterial agents, heat stabilizers, antioxidants, release agents, light stabilizers, surfactants, coupling agents, plasticizers, admixtures, colorants, stabilizers, lubricants, antistatic agents, coloring aids, flame proofing agents, weather-resistance agents, ultraviolet (UV) absorbers, ultraviolet (UV) blocking agents, nucleating agents, adhesion aids, adhesives, and the like, and combinations thereof.

Examples of the antioxidant may include without limitation phenol antioxidants, phosphite antioxidants, thioether antioxidants, amine antioxidants, and the like, and combinations there. Examples of the release agent may include without limitation fluorine-included polymers, silicone oils, stearic metal salts, montanic metal salts, montanic ester waxes, polyethylene waxes, and the like, and combinations thereof. Examples of the weather-resistance agent may include without limitation benzophenone-type weather-resistance agents, amine-type weather-resistance agents, and the like, and combinations thereof. Examples of the colorant may include without limitation dyes, pigments, and the like, and combinations thereof. Examples of the ultraviolet (UV) blocking agent may include without limitation titanium dioxide ($TiO_2$), carbon black, and the like, and combinations thereof. Examples of the nucleating agent may include without limitation talc, clay, and the like and combinations thereof.

The additive may be included in a predetermined amount as long as it does not deteriorate the properties of the thermoplastic resin composition. In exemplary embodiments, the thermoplastic resin composition may include the additive in an amount of less than or equal to about 40 parts by weight, for example about 0.1 to about 30 parts by weight, based on about 100 parts by weight of the thermoplastic resin composition.

The thermoplastic resin composition may be prepared using any well-known method of preparing a resin composition. For example, each component according to one embodiment can be simultaneously mixed, optionally with one or more additives. The mixture can be melt-extruded and prepared as pellets.

According to another embodiment, a molded product fabricated using the thermoplastic resin composition is provided. The thermoplastic resin composition can be used to manufacture a molded product using any various known processes such as injection molding, blow molding, extrusion molding, thermal molding, and the like. The thermoplastic resin composition may be used to make a molded product, such as plastic outer parts of various products including without limitation electronic parts, automobile parts, and the like, having minimal or no flow marks and/or weld lines and having a metal-like texture.

The following examples illustrate this invention in more detail. However, it is understood that this invention is not limited by these examples.

A thermoplastic resin composition according to one embodiment includes each component as follows.

(A) Thermoplastic Resin
As a rubber modified vinyl-based copolymer resin, SD-0150 produced by Cheil Industries Inc., which is an acrylonitrile-butadiene-styrene (ABS) resin, is used.

(B) Amorphous Sheet-Shaped Metal Particle
(B-1) Amorphous sheet-shaped aluminum particles having a cross-sectional area of 1,200 $\mu m^2$, a long diameter of 40 $\mu m$, and a thickness of 5 $\mu m$ are used.
(B-2) Amorphous sheet-shaped aluminum particles having a cross-sectional area of 1,200 $\mu m^2$, a long diameter of 40 $\mu m$, and a thickness of 0.5 $\mu m$ are used.

(C) Sparkling Particle
(C-1) Metal particle obtained by punching
(C-1-1) Aluminum particles having a cross-sectional area of 2,500 $\mu m^2$, a long diameter of 50 $\mu m$, and a thickness of 10 $\mu m$ are used.
(C-1-2) Aluminum particles having a cross-sectional area of 2,500 $\mu m^2$, a long diameter of 50 $\mu m$, and a thickness of 6 $\mu m$ is used.
(C-2) Inorganic particle
Amorphous sheet-shaped glass particles having a cross-sectional area of 2,000 $\mu m^2$, a long diameter of 50 $\mu m$, and a thickness of 4 $\mu m$ is used.

Examples 1 to 9 and Comparative Examples 1 to 6

The thermoplastic resin compositions according to Examples 1 to 9 and Comparative Examples 1 to 6 are prepared using the components described above in the amounts described in Table 1.

As for the manufacturing method, the components are mixed in the amounts shown in the following Table 1, and the mixture is extruded at a temperature range of 180 to 240° C. with a typical twin-screw extruder, and the extruded material is manufactured into pellets.

Experimental Examples

The manufactured pellets are dried at 80° C. for 4 hours, and a material specimen is manufactured using an injection molding machine capable of 6 oz injection, setting a cylinder temperature at 210 to 230° C., a molding temperature at 100° C. and molding cycle time at 30 seconds, and performing injection-molding to form ASTM dumb-bell specimens. The properties of the manufactured material specimen are measured in accordance with the following methods and the results are shown in the following Tables 1 and 2.

1) IZOD impact strength: measured according to ASTM D256 (specimen thickness ⅛").

2) Injection appearance: Injection is performed to form a weld line by using a mold having two gates, and the result of observing the appearance of an injected material is shown based on the standards shown in the following Table 2.

TABLE 1

| | | | Examples | | | | | | | | | Comparative Examples | | | | | |
|---|---|---|---|---|---|---|---|---|---|---|---|---|---|---|---|---|---|
| | | | 1 | 2 | 3 | 4 | 5 | 6 | 7 | 8 | 9 | 1 | 2 | 3 | 4 | 5 | 6 |
| (A) Thermoplastic resin (parts by weight) | | | 100 | 100 | 100 | 100 | 100 | 100 | 100 | 100 | 100 | 100 | 100 | 100 | 100 | 100 | 100 |
| (B) Amorphous sheet-shaped metal particle | (B-1, parts by weight) | | 0.5 | 1 | 0.5 | 0.5 | 1 | 1 | 0.5 | 0.5 | 0.5 | — | — | — | — | — | — |
| | (B-2, parts by weight) | | — | — | — | — | — | — | — | — | — | 0.5 | 1 | 10 | — | — | — |
| (C) Sparkling particle | (C-1, parts by weight) | (C-1-1) | 0.3 | 0.3 | — | 0.3 | 0.3 | — | 0.05 | 0.3 | 0.05 | — | — | — | 1 | — | — |
| | | (C-1-2) | — | — | — | — | — | — | — | — | — | — | — | — | — | — | 1 |
| | (C-2, parts by weight) | | — | — | 0.3 | 0.3 | 0.3 | 1 | 0.3 | 0.1 | 0.1 | — | — | — | — | 1 | — |

TABLE 1-continued

| | | Examples | | | | | | | | | Comparative Examples | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| | IZOD impact strength (kgf · cm/cm) | 14 | 12 | 13 | 12 | 11 | 10 | 13 | 13 | 14 | 14 | 13 | 3 | 13 | 8 | 11 |
| Injection appearance | Metal-like texture | ○ | ◎ | ○ | ◎ | ◎ | ◎ | ◎ | ◎ | ◎ | ○ | ◎ | ◎ | ○ | X | ○ |
| | Flow mark | ◎ | ◎ | ◎ | ◎ | ◎ | ◎ | ◎ | ◎ | ◎ | X | X | X | Δ | ◎ | X |
| | Weld line | ◎ | ○ | ◎ | ◎ | ○ | ○ | ◎ | ◎ | ◎ | X | X | X | Δ | ◎ | X |

TABLE 2

| Flow mark | | Metal-like texture | Weld line |
|---|---|---|---|
| ◎ | None | Excellent | None |
| ○ | A little | Good | A little |
| Δ | Occurrence | A little | Occurrence |
| X | Serious occurrence | None | Serious occurrence |

The thermoplastic resin compositions according to Examples 1 to 9 including a thermoplastic resin and an amorphous sheet-shaped metal particle having a ratio of a thickness relative to a long diameter of about 1:20 to about 1:1 in accordance with one embodiment have excellent impact strength, formed a little or no flow mark or weld line, and provided an excellent metal-like texture, compared with the thermoplastic resin compositions according to Comparative Examples 1 to 3 using an amorphous sheet-shaped metal particle having a ratio of a thickness relative to a long diameter outside of the range of about 1:20 to about 1:1 and the thermoplastic resin compositions according to Comparative Examples 4 to 6 without an amorphous sheet-shaped metal particle having a ratio of a thickness relative to a long diameter of about 1:20 to about 1:1.

Figure 2:
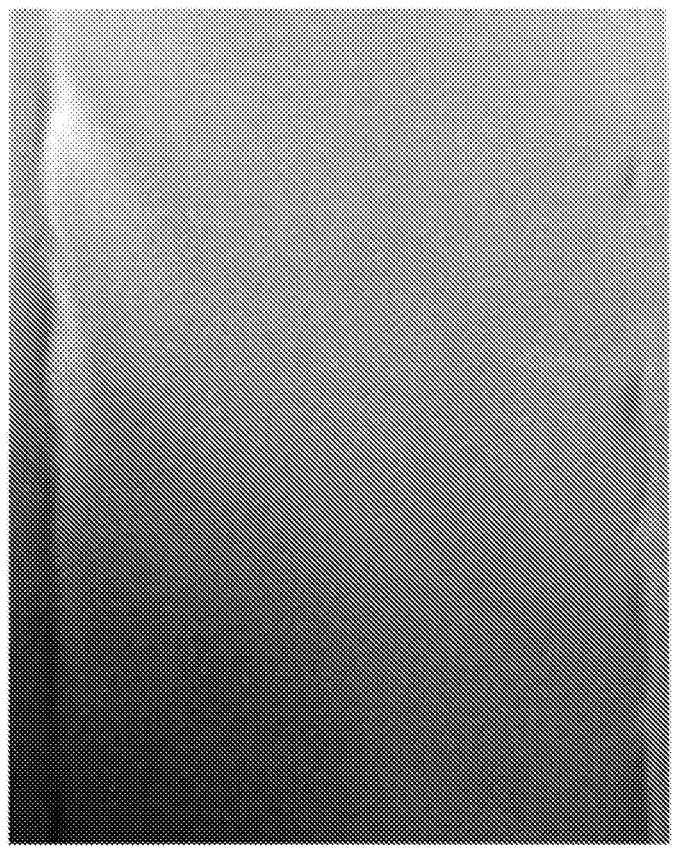
FIG. 2 is a photograph illustrating the metal-like texture and flow marks of an injection molded product formed of a thermoplastic resin composition according to Comparative Example 2.

FIG. 1 is a photograph illustrating the metal-like texture and flow marks of an injection molded product of a thermoplastic resin composition according to Example 4, and FIG. 2 is a photograph illustrating the metal-like texture and flow marks of an injection molded product of a thermoplastic resin composition according to Comparative Example 2. FIG. 1 shows excellent metal-like texture and no flow mark, and FIG. 2 shows excellent metal-like texture but many flow marks.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition, comprising
a thermoplastic resin;
an amorphous sheet-shaped metal particle having a ratio of thickness relative to long diameter of about 1:20 to about 1:1; and
a sparkling particle having a flat surface reflecting light,
wherein the sparkling particle comprises a metal particle having a ratio of thickness relative to a long diameter of about 1:10 to about 1:1 obtained by punching and an inorganic particle in a weight ratio of the metal particle to the inorganic particle of about 1:10 to about 10:1.

2. The thermoplastic resin composition of claim 1, wherein the thermoplastic resin comprises a polycarbonate resin, a rubber modified vinyl-based copolymer resin, a polyester resin, a polyalkyl(meth)acrylate resin, or a combination thereof.

3. The thermoplastic resin composition of claim 1, wherein the amorphous sheet-shaped metal particle is made of a material including aluminum, copper, gold, or a combination thereof.

4. The thermoplastic resin composition of claim 1, wherein the amorphous sheet-shaped metal particle has a ratio of thickness relative to long diameter of about 1:15 to about 1:2.

5. The thermoplastic resin composition of claim 1, comprising the amorphous sheet-shaped metal particle in an amount of about 0.05 to about 10 parts by weight based on about 100 parts by weight of the thermoplastic resin.

6. The thermoplastic resin composition of claim 1, wherein the metal particle obtained by punching is made of a material including aluminum, copper, gold, or a combination thereof.

7. The thermoplastic resin composition of claim 1, wherein the inorganic particle comprises a glass particle, mica, graphite, a pearl particle, or a combination thereof.

8. The thermoplastic resin composition of claim 1, wherein the inorganic particle has a long diameter of about 10 to about 200 μm and a thickness of about 0.5 to about 10 μm.

9. The thermoplastic resin composition of claim 1, wherein the metal particle obtained by punching and the inorganic particle are mixed in a weight ratio of about 1:6 to about 3:1.

10. The thermoplastic resin composition of claim 1, comprising the sparkling particle in an amount of about 0.01 to about 10 parts by weight based on about 100 parts by weight of the thermoplastic resin.

11. A molded product fabricated using the thermoplastic resin composition of claim 1.

* * * * *